(12) United States Patent
Ki et al.

(10) Patent No.: US 11,630,731 B2
(45) Date of Patent: Apr. 18, 2023

(54) SYSTEM AND DEVICE FOR DATA RECOVERY FOR EPHEMERAL STORAGE

(71) Applicant: Samsung Electronics Co., Ltd., Suwon-si (KR)

(72) Inventors: Yang Seok Ki, Palo Alto, CA (US); Sungwook Ryu, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/159,913

(22) Filed: Jan. 27, 2021

(65) Prior Publication Data

US 2022/0012147 A1 Jan. 13, 2022

Related U.S. Application Data

(60) Provisional application No. 63/057,744, filed on Jul. 28, 2020, provisional application No. 63/052,854, (Continued)

(51) Int. Cl.
*G06F 11/00* (2006.01)
*G06F 11/14* (2006.01)
(Continued)

(52) U.S. Cl.
CPC .......... *G06F 11/1428* (2013.01); *G06F 3/065* (2013.01); *G06F 3/0619* (2013.01); *G06F 3/0634* (2013.01); *G06F 3/0644* (2013.01); *G06F 3/0649* (2013.01); *G06F 3/0673* (2013.01); *G06F 3/0679* (2013.01);
(Continued)

(58) Field of Classification Search
CPC ............. G06F 11/1064; G06F 11/1068; G06F 11/1484; G06F 11/203; G06F 11/3037
See application file for complete search history.

(56) References Cited

U.S. PATENT DOCUMENTS 6,049,439 A  4/2000 Ono et al.
6,883,126 B1  4/2005 Herman et al.
(Continued)

OTHER PUBLICATIONS

Unpublished U.S. Appl. No. 17/109,017, filed Dec. 1, 2020.
(Continued)

*Primary Examiner* — Elmira Mehrmanesh
(74) *Attorney, Agent, or Firm* — Lewis Roca Rothgerber Christie LLP

(57) ABSTRACT

In various embodiments, a method for page cache management is described. The method can include: identifying a storage device fault associated with a fault-resilient storage device; determining that a first region associated with the fault-resilient storage device comprises an inaccessible space and that a second region associated with the fault-resilient storage device comprises an accessible space; identifying a read command at the second storage device for the data and determine, based on the read command, first data requested by a read operation from a local memory of the second storage device; determining, based on the read command, second data requested by the read operation from the second region; retrieving the second data from the second region; and scheduling a transmission of the second data from the fault-resilient storage device to the second storage device.

20 Claims, 11 Drawing Sheets

Related U.S. Application Data filed on Jul. 16, 2020, provisional application No. 63/051,158, filed on Jul. 13, 2020.

(51) Int. Cl.

| | | |
|---|---|---|
| *G06F 3/06* | (2006.01) | |
| *G06F 11/07* | (2006.01) | |
| *G06F 11/30* | (2006.01) | |
| *G06F 11/32* | (2006.01) | |
| *G06F 11/34* | (2006.01) | |
| *G06F 11/10* | (2006.01) | |
| *G06F 11/20* | (2006.01) | |
| *G06F 12/1009* | (2016.01) | |
| *G06F 12/0882* | (2016.01) | |

(52) U.S. Cl.
CPC ...... *G06F 11/0772* (2013.01); *G06F 11/1068* (2013.01); *G06F 11/1076* (2013.01); *G06F 11/1484* (2013.01); *G06F 11/203* (2013.01); *G06F 11/2089* (2013.01); *G06F 11/2094* (2013.01); *G06F 11/3034* (2013.01); *G06F 11/3037* (2013.01); *G06F 11/3072* (2013.01); *G06F 11/327* (2013.01); *G06F 11/3409* (2013.01); *G06F 12/0882* (2013.01); *G06F 12/1009* (2013.01); *G06F 2201/85* (2013.01); *G06F 2212/262* (2013.01)

(56) References Cited

U.S. PATENT DOCUMENTS

| | | | |
|---|---|---|---|
| 6,995,943 | B1 | 2/2006 | Shrestha et al. |
| 7,451,346 | B2 | 11/2008 | Katsuragi et al. |
| 7,536,595 | B1 | 5/2009 | Hiltunen et al. |
| 7,640,450 | B1 | 12/2009 | Anvin et al. |
| 7,774,643 | B2 | 8/2010 | Wang |
| 7,797,567 | B2 | 9/2010 | Otaka et al. |
| 8,015,436 | B2 | 9/2011 | Winokur |
| 8,145,603 | B2 | 3/2012 | Yamagami |
| 8,589,723 | B2 | 11/2013 | Kumar et al. |
| 8,769,535 | B2 | 7/2014 | Mani |
| 9,158,924 | B2 * | 10/2015 | Maeda .................... G06F 21/78 |
| 9,372,755 | B1 | 6/2016 | Bruce et al. |
| 9,378,083 | B2 | 6/2016 | Ghaly et al. |
| 9,397,703 | B2 | 7/2016 | Ghaly et al. |
| 9,710,317 | B2 | 7/2017 | Gupta et al. |
| 9,728,277 | B2 | 8/2017 | Lee et al. |
| 9,830,236 | B2 | 11/2017 | Antony |
| 10,013,325 | B1 | 7/2018 | Garrett, Jr. et al. |
| 10,073,633 | B2 | 9/2018 | Tsao et al. |
| 10,095,506 | B2 * | 10/2018 | Gopalapura Venkatesh ................ H04L 41/082 |
| 10,102,082 | B2 | 10/2018 | Cabrera et al. |
| 10,263,842 | B2 | 4/2019 | Bursell |
| 10,445,200 | B2 | 10/2019 | Park et al. |
| 10,572,161 | B2 | 2/2020 | Subramanian et al. |
| 2004/0228493 | A1 | 11/2004 | Ma |
| 2005/0120267 | A1 | 6/2005 | Burton et al. |
| 2006/0143507 | A1 | 6/2006 | Tanaka |
| 2007/0101188 | A1 | 5/2007 | Lin |
| 2009/0222617 | A1 | 9/2009 | Yano et al. |
| 2010/0125751 | A1 | 5/2010 | McKean |
| 2011/0012147 | A1 | 1/2011 | Bierhuizen et al. |
| 2012/0089767 | A1 | 4/2012 | Lee et al. |
| 2013/0047028 | A1 | 2/2013 | Daikokuya et al. |
| 2013/0282953 | A1 | 10/2013 | Orme et al. |
| 2014/0032834 | A1 | 1/2014 | Cudak et al. |
| 2014/0089580 | A1 | 3/2014 | Yochai et al. |
| 2014/0195847 | A1 | 7/2014 | Webman et al. |
| 2015/0100720 | A1 | 4/2015 | Flynn et al. |
| 2016/0342465 | A1 | 11/2016 | Cudak et al. |
| 2016/0378688 | A1 * | 12/2016 | Rozas ................ G06F 12/1483 713/190 |
| 2017/0177216 | A1 | 6/2017 | Freyensee et al. |
| 2017/0192886 | A1 * | 7/2017 | Boehm ............... G06F 12/0815 |
| 2017/0277458 | A1 | 9/2017 | Yamamoto |
| 2018/0011649 | A1 | 1/2018 | Hashimoto et al. |
| 2018/0113761 | A1 | 4/2018 | Ko et al. |
| 2018/0239707 | A1 * | 8/2018 | Tsirkin ................ G06F 9/45558 |
| 2018/0316756 | A1 | 11/2018 | Kuramkote et al. |
| 2019/0205220 | A1 * | 7/2019 | Zhang ................. G06F 11/0793 |
| 2019/0250849 | A1 | 8/2019 | Compton et al. |
| 2019/0377637 | A1 | 12/2019 | Pitchumani et al. |
| 2019/0384670 | A1 | 12/2019 | Kuroki et al. |
| 2020/0135280 | A1 | 4/2020 | Hu |
| 2020/0310932 | A1 | 10/2020 | Hutchinson et al. |
| 2021/0255778 | A1 | 8/2021 | Garewal |
| 2021/0349782 | A1 | 11/2021 | Ki et al. |
| 2021/0350033 | A1 | 11/2021 | Kapinos et al. |
| 2021/0373796 | A1 | 12/2021 | Matosevich et al. |

OTHER PUBLICATIONS

Unpublished U.S. Appl. No. 17/109,041, filed Dec. 1, 2020.
Unpublished U.S. Appl. No. 17/109,053, filed Dec. 1, 2020.
Notice of Allowance for U.S. Appl. No. 17/109,053 dated Jul. 13, 2022, 6 pages.
Notice of Allowance for U.S. Appl. No. 17/109,053 dated Mar. 18, 2022, 9 pages.
Office Action for U.S. Appl. No. 17/109,017 dated Apr. 18, 2022, 13 pages.
Final Office Action for U.S. Appl. No. 17/109,017 dated Aug. 17, 2022, 15 pages.
Office Action for U.S. Appl. No. 17/109,041 dated Sep. 22, 2022, 10 pages.
Notice of Allowance for U.S. Appl. No. 17/109,017 dated Nov. 18, 2022, 8 pages.
Notice of Allowance for U.S. Application No. 1/7109,053 dated Dec. 2, 2022, 5 pages.
U.S. Final Office Action dated Dec. 19, 2022, issued in U.S. Appl. No. 17/109,041 (11 pages).

* cited by examiner

| Case ID | Operation Status | User Data | ReUse /How to |
|---|---|---|---|
| 1 | Fatal Error | Invalid | Can't |
| 2 | Fatal Error | Invalid | Can / Format NVM |
| 3 | Read Only Mode | Valid | Can't |
| 4 | Write Through Mode | Valid | Can't |
| 5 | Temperature Safe Mode | Valid | Can't |
| 6 | Read Only Mode | Valid | Can / Format NVM |

FIG. 2A

| Mode | P | UP | RO | VRO | IA |
|---|---|---|---|---|---|
| FR_MODE_POWER_CYCLE | 100% | | | | |
| FR_MODE_REFORMAT | 100% | | | | |
| FR_MODE_CAPACITY_READ_ONLY* | X% | | (100-X)% | | |
| FR_MODE_CAPACITY* | X% | | | | (100-X)% |
| FR_MODE_PERFORMANCE | | 100% | | | |
| FR_MODE_READ_ONLY | | | 100% | | |
| FR_MODE_PARTIAL_READ_ONLY* | | | X% | | (100-X)% |
| FR_MODE_TEMP_READ_ONLY* | | | | 100% | |
| FR_MODE_TEMP_PARTIAL_READ_ONLY* | | | | X% | (100-X)% |
| FR_MODE_VULNERABLE | | | | | 100% |

FIG. 2B

| Command | Description |
|---|---|
| FR_INFO_RESILIENCY_TYPE | Returns the type of fault resiliency in case of failure. |
| FR_INFO_RETENTION_PERIOD | Returns the average retention period without reprogramming by NAND media. This information is used for temporary read-only mode (FR_MODE_TEMP_READ_ONLY) or temporary partial read-only mode (FR_MODE_TEMP_PARTIAL_READ_ONLY). This is the upper-bound of retention time for data on the device from the time of the failure. |
| FR_INFO_EARLIEST_EXPIRY | Returns the maximum time remaining for data integrity. This information is used for temporary read-only mode (FR_MODE_TEMP_READ_ONLY) or temporary partial read-only mode (FR_MODE_TEMP_PARTIAL_READ_ONLY). This is the lower-bound of retention time for data on the device from the time of the failure. Note: the unit of time may be determined based on the patrol period. |
| FR_INFO_IOPS | Returns the percentage of the maximum available IOPS on failure. This information is used for low performance mode (FR_MODE_PERFORMANCE). |
| FR_INFO_BW | Returns the percentage of the maximum available IOPS on failure. This information is used for low performance mode (FR_MODE_PERFORMANCE). |
| FR_INFO_SPACE | Returns the available space on failure. This information is used for small capacity with read-only mode (FR_MODE_CAPACITY_READ_ONLY) or small capacity (FR_MODE_CAPACITY) type. |

FIG. 2C

| |
|---|
| • FAULT_RESILIENT_FEATURE |
| –This returns the fault resilient classes and features in each class that this device supports<br>–FR_FULLY_RESILIENT<br>    • FR_POWER_CYCLE: device can be recovered by power cycling<br>    • FR_REFORMAT: device can be recovered by reformatting<br>–FR_PARTIAL_RESILIENT<br>    • FR_PERFORMANCE_LOSS: device performance is reduced<br>      –FR_IOPS: IOPS can be reduced<br>      –FR_BW: Bandwidth can be reduced<br>    • FR_CAPABILITY_LOSS<br>      –FR_SUSTAINABLE_READ_ONLY: device can be read-only longer than NAND retention time<br>–FR_UNSUSTAINABLE_READ_ONLY: device can be read-only up to NAND retention time<br>    • FR_SPACE_LOSS<br>      –FR_SPACE: the device storage space is reduced<br>–VULNERABLE<br>    • GRACEFUL_EXIT |
| • FAULT_RESILIENT_STATUS |
| –This returns the status of device after fault resilient recovery is done.<br>–FR_IOPS: the available IOPS is X%<br>–FR_BW: the available BW is Y%<br>–FR_SPACE: the available storage space is Z%<br>–FR_RETENTION: average retention period of media used in this device |
| • FAULT_RESILIENT_VOLATILE_BLOCKS(H) |
| –This returns a list of LBA ranges that reach to the retention period in next H hours<br>–This can be used to determine the blocks that need to be relocated for unsustainable read only |
| •FAULT_RESILIENT_INVALID_DATA_BLOCKS |
| –This returns a list of LBA ranges that become invalid after switch to a fault resilient mode |

FIG. 2D

SYSTEM AND DEVICE FOR DATA RECOVERY FOR EPHEMERAL STORAGE

CROSS-REFERENCE TO RELATED APPLICATION(S)

The present application claims priority to and the benefit of (i) U.S. Provisional Application No. 63/051,158, filed Jul. 13, 2020, entitled "Fault Resilient Storage Device and Interfaces", (ii) U.S. Provisional Application No. 63/052,854, filed Jul. 16, 2020, entitled "Fault Resilient Drive with Sustainable Read-only Feature", and (iii) U.S. Provisional Application No. 63/057,744, filed Jul. 28, 2020, entitled "Fault Resilient RAID-0 Method Using Fault Resilient Drives." The entire contents of all of the applications identified in this paragraph are incorporated herein by reference.

FIELD

One or more aspects of embodiments according to the present disclosure relate to data storage systems, and more particularly to data storage systems and devices configured to provide data recovery, for example, in the context of ephemeral storage.

BACKGROUND

The present background section is intended to provide context only, and the disclosure of any embodiment or concept in this section does not constitute an admission that said embodiment or concept is prior art.

Storage devices and systems have wide applicability within a variety of data processing systems. In some embodiments, storage devices can be used to host at least some aspects associated with a virtual machine (VM), which can refer to an emulation of a computer system. VMs can include implementations that may involve specialized hardware, software, and/or combinations thereof. Further, storage devices may be sufficiently complex to be able to encounter a significant range of internal fault conditions, including, for example, temperature sensor failures, or radiation-induced bit flips. Such fault conditions can reduce the efficiency with which certain operations can be performed on or with storage devices.

Thus, there is a need for a system and method for resilient operations associated with storage devices and/or systems containing storage devices.

SUMMARY

In some embodiments, a method for page cache management is described. The method can include: identifying a storage device fault associated with a fault-resilient storage device; determining that a first region associated with the fault-resilient storage device comprises an inaccessible space and that a second region associated with the fault-resilient storage device comprises an accessible space; identifying a read command at the second storage device for the data and determine, based on the read command, first data requested by a read operation from a local memory of the second storage device; determining, based on the read command, second data requested by the read operation from the second region; retrieving the second data from the second region; and scheduling a transmission of the second data from the fault-resilient storage device to the second storage device. The method can further include: determining, based on the read command, third data requested by the read operation from the inaccessible space of the fault-resilient storage device; and returning, based on the determination of the third data, an error from the fault-resilient storage device to the second storage device.

In another embodiment, the method can further include: identifying a write command at the fault-resilient storage device for the data; writing at least a portion of the data to a page cache of a host device; determining that the portion of the data comprises dirty data and writing the dirty data to a persistent memory of the second storage device; and determining that the portion of the data comprises clean data associated with the inaccessible space and writing the clean data to a persistent memory of the second storage device.

In various embodiments, the transmission of data can include a live migration of at least one virtual machine from the fault-resilient storage device to the second storage device. In some embodiments, the first data comprises at least a portion of the data that is cached at the local memory. In various embodiments, the local memory comprises a dynamic random access memory (DRAM) and the determination of the first data is from a page cache. In some embodiments, the data comprises data associated with at least one virtual machine of a host device. In various embodiments, the device fault comprises the fault-resilient storage device operating in a partial read-only mode wherein the fault-resilient storage device performs at a reduced performance or at a reduced capacity. In some embodiments, at least one of the fault-resilient storage device or the second storage device comprise a solid state drive. In various embodiments, a device for page cache management is described. The device can include: at least one memory device that stores computer-executable instructions; and at least one processor configured to access the at least one memory device, wherein the at least one processor is configured to execute the computer-executable instructions to: identify a storage device fault associated with a fault-resilient storage device; determine that a first region associated with the fault-resilient storage device comprises an inaccessible space and that a second region associated with the fault-resilient storage device comprises an accessible space; identify a read command at a second storage device for data and determine, based on the read command, first data requested by a read operation from a local memory of the second storage device; determine, based on the read command, second data requested by the read operation from the second region; retrieve the second data from the second region; and schedule a transmission of the second data from the fault-resilient storage device to the second storage device.

In various embodiments, the at least one processor can be further configured to execute the computer-executable instructions to: determine, based on the read command, third data requested by the read operation from the inaccessible space of the fault-resilient storage device; and return, based on the determination of the third data, an error from the fault-resilient storage device to the second storage device. The at least one processor can be further configured to execute the computer-executable instructions to: identify a write command at the fault-resilient storage device for the data; write at least a portion of the data to a page cache of a host device; determine that the portion of the data comprises dirty data and writing the dirty data to a persistent memory of the second storage device; and determine that the portion of the data comprises clean data associated with the inaccessible space and writing the clean data to a persistent memory of the second storage device.

In another embodiment, the transmission of data can include a live migration of at least one virtual machine from the fault-resilient storage device to the second storage device. In some embodiments, the first data can include at least a portion of the data that is cached at the local memory. In various embodiments, the local memory comprises a DRAM and the determination of the first data is from a page cache, and wherein the data comprises data associated with at least one virtual machine of a host device. In some embodiments, the storage device fault can include the fault-resilient storage device operating in a partial read-only mode wherein the fault-resilient storage device performs at a reduced performance or at a reduced capacity.

In various embodiments, a non-transitory computer-readable medium is described. The non-transitory computer-readable medium can store computer-executable instructions which, when executed by a processor, cause the processor to perform operations including: identifying a storage device fault associated with a fault-resilient storage device; determining that a first region associated with the fault-resilient storage device comprises an inaccessible space and that a second region associated with the fault-resilient storage device comprises an accessible space; identifying a read command at a second storage device for data and determining, based on the read command, first data requested by a read operation from a local memory of the second storage device; determining, based on the read command, second data requested by the read operation from the second region; retrieving the second data from the second region; and scheduling a transmission of the second data from the fault-resilient storage device to the second storage device.

The non-transitory computer-readable medium can further include computer-executable instructions for: determining, based on the read command, third data requested by the read operation from the inaccessible space of the fault-resilient storage device; and returning, based on the determination of the third data, an error from the fault-resilient storage device to the second storage device.

The non-transitory computer-readable medium further comprises computer-executable instructions for: identifying a write command at the fault-resilient storage device for the data; writing at least a portion of the data to a page cache of a host device; determining that the portion of the data comprises dirty data and writing the dirty data to a persistent memory of the second storage device; and determining that the portion of the data comprises clean data associated with the inaccessible space and writing the clean data to a persistent memory of the second storage device. In another embodiment, the transmission of data can include a live migration of at least one virtual machine from the fault-resilient storage device to the second storage device.

As noted, in some embodiments, the systems, methods, and device can include a fault resilient storage device. The fault resilient storage device may be capable of operating in various resilient modes, while maintaining partial capability, or of returning to full functionality in spite of internal faults. For example, one of the ways in which the storage device may maintain partial capability is to operate, in some circumstances, in a read-only mode, in which the storage device may respond to read requests from a host but return an error message if the storage device receives a write request from a host.

BRIEF DESCRIPTION OF THE DRAWINGS

The drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 2A is a table of fault states of a storage device illustrating various fault modes that a fault resilient storage device may face, for example, during live migration of VMs, according to an embodiment of the present disclosure;

FIG. 2B is a table of operating modes of a storage device which can represent different states of the fault resilient storage device during live migration, according to an embodiment of the present disclosure;

FIG. 2C is a table of commands for sending to a storage device by a host, according to an embodiment of the present disclosure;

FIG. 2D is a table showing a hierarchy of resilient modes, according to an embodiment of the present disclosure;

DETAILED DESCRIPTION

Figure 1:
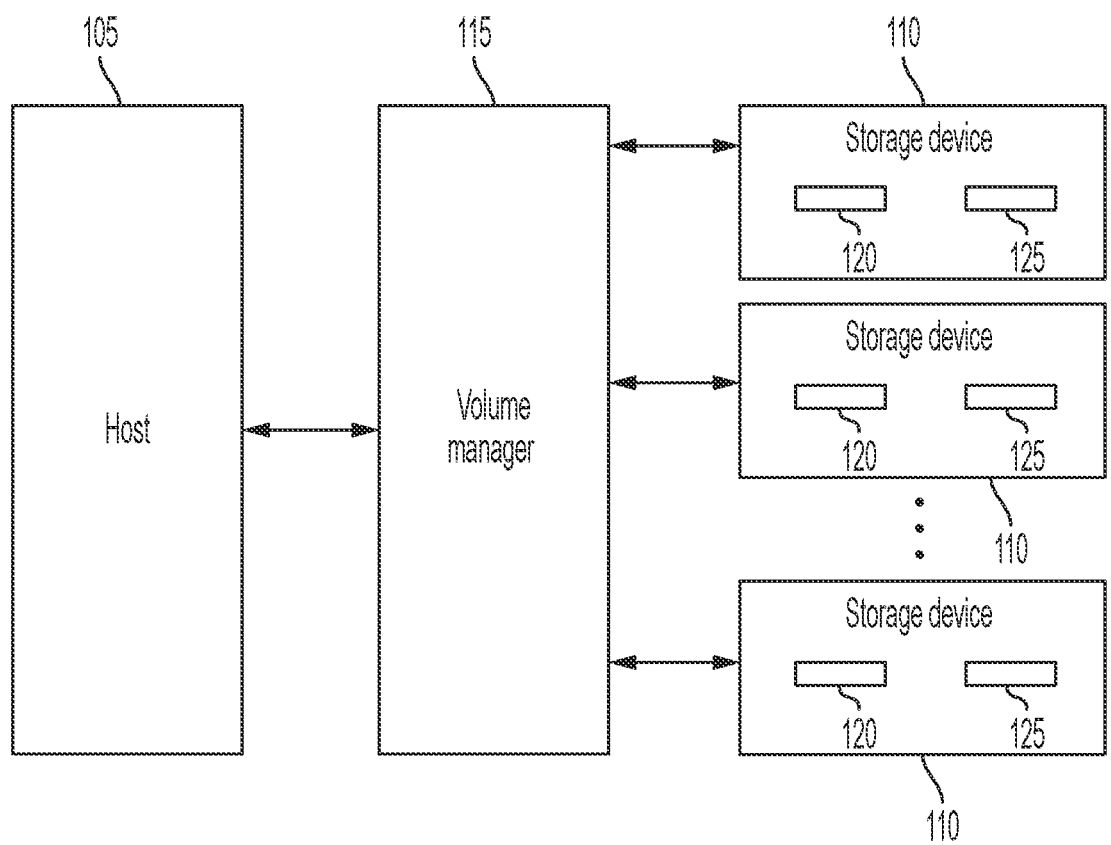
FIG. 1 is a block diagram of a data storage system showing a context in which the disclosed systems can operate, according to an embodiment of the present disclosure.

The detailed description set forth below in connection with the appended drawings is intended as a description of exemplary embodiments of a system and method for resilient operation of storage devices and systems containing storage devices provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, the disclosed systems can be used to perform a live migration of virtual machines (VMs) from a fault resilient storage device (to be described further below in the context of FIGS. 1-3) to another storage device. In particular, migration can refer to a process by which a running virtual machine is moved from one physical host to another (e.g., with supporting storage devices), with little or no disruption in service. Further, live migration (described further below) can refer to the process of moving a running virtual machine or application between different physical machines (e.g., computing devices include storage devices) without disconnecting the client or application. In some embodiments, at least portions of memory, storage, and network connectivity of the virtual machine can be transferred from a source device to a destination device.

In various embodiments, the disclosed systems can include storage devices that support the operation of the VMs, and can further support the live migration of VMs between source and destination devices. In some respects, the disclosure can reference source device and destination device, which can represent devices that include storage devices such as fault resilient storage devices, which can be used to store at least some of the data and information associated with the VMs. It is to be understood that terminology such as source device, source storage device, destination device, and/or destination storage device may be used interchangeably herein without departing from the scope of the disclosure.

In some embodiments, as noted, the storage device can further include a fault resilient storage device that experiences a fault and is converted to a reduced performance mode of operation, for example, a read-only mode of operation or a partial-ready only mode of operation, as described further below. In some aspects, such a fault resilient storage device may be configured to operate in a server on the source side and may be at least partially performing operations (e.g., storage-related operations) to support a virtual machine. Accordingly, the disclosed systems are configured to allow for the live migration of a virtual machine that is at least partially hosted on the fault resilient storage device that experiences a fault to a second device (e.g., a second storage device). In particular, the disclosed systems can use a methodology involving checking for data on a combination of source device working (e.g., volatile) memory, secondary storage (e.g., fault resilient storage device non-volatile memory) and destination device working (e.g., volatile) memory and secondary storage (e.g., second storage device non-volatile memory). Further, it is to be understood that the terms working memory and volatile memory and secondary storage, persistent memory, and non-volatile memory can be used interchangeably herein without departing from the scope of the disclosure.

As noted above, the disclosed systems can be configured to operate in connection with fault resilient storage devices, in order to perform aspects of the live migration of VMs from the fault resilient storage device to a second device (e.g., a destination device). In some embodiments, a fault resilient storage device may be capable of operating in various resilient modes, and capable of maintaining partial capability, or returning to full functionality, in spite of internal faults. For example, in response to a temperature sensor failure, the storage device may operate at a reduced rate, or at a reduced rate for write operations, or it may cease to perform write operations entirely. In response to a transient failure that may have corrupted the storage media, the storage device may reformat the storage media. In response to a transient failure that did not corrupt the storage media, the storage device may cycle power. One of the ways in which the storage device may maintain partial capability is to operate, in some circumstances, in a read-only mode, in which the storage device may respond to read requests from a host but return an error message if it receives a write request from a host. It may also move data that is about to expire to a rescue area, so that the data will not be lost as a result of expiring.

In various embodiments, for non-fault resilient storage devices that do not experience a fault, the storage devices can perform a live migration of VMs by copying an image of the data from a storage device associated with the source device to a storage device associated with a destination device, for example, using a memory copy operation. In some respects (as further shown and described in connection with FIG. 4A, below), in this case, during the live migration, a portion of the data may stay in volatile memory (e.g., DRAM), while another portion of the data can be written to secondary storage (e.g., a second storage device). For example, some clean (C) data, dirty (D) data (e.g., data that has been accessed and modified but has not written to secondary storage yet), and/or evicted data (e.g., data that can has been or can be discarded) may remain in the volatile memory during live migration. Accordingly, in the case of the live migration with no storage device fault, the disclosed systems can complete writing data from source device to the disk of the destination device. After performing the live migration, the disclosed systems can free the source device (e.g., after performing a partial or complete memory copy from the source device to the destination device). Further, if another device (e.g., a device running an application associated with the source device and/or destination device) needs to access data on the secondary storage of the destination device, the disclosed systems can be configured to permit a remote disk access through an associated network (e.g., via a remote disk access to the destination device). However, if the source device experiences a fault, a migration process may be inhibited at least because, in some systems, the underlying disk may be unresponsive (even if the volatile memory has at least part of the data) and therefore migration may not be continued without additional techniques.

However, as described further herein, in various embodiments, if the source device comprises a fault resilient storage device and the fault resilient storage device has been configured into a read only mode of operation, the disclosed systems can maintain some level of access to the source device (e.g., access to a portion of the non-volatile memory and/or the volatile memory of the source device) to read some of the data and transfer that data to the destination device in order to continue the migration process.

In another embodiment, the disclosed systems can be configured to perform live migration of virtual machines even if the source device is not in a full read-only mode of operation, but rather, is in a partial read-only mode of operation (e.g., a mode of operation in which the storage device has a reduced performance for read operations). In some embodiments, the disclosed systems can be configured to perform certain opportunistic recovery operations associated with the data on the fault resilient source device that experiences a fault and is in the partial read-only mode of operation (e.g., the storage device operates with a lower performance, a smaller capacity, or less capability while in the read-only mode of operation). For example, the disclosed systems can be configured to recover data that is written to a faulty area of the memory (e.g., non-volatile memory) associated with the fault resilient device if the data was written recently within a predetermined duration (e.g., giving rise to the ephemeral storage applicability of the various embodiments described herein) by using the info residing in volatile memory (e.g., DRAM). In particular, the disclosed systems can be configured to use DRAM information associated with the source device and/or the destination device in order to perform this aspect of the live migration.

In various embodiments, the disclosed systems can be used, as noted, in the context of performing a live migration of virtual machines, which will now be described in further detail. Some example operations for live migration of virtual machines may include at least some of the following. In some respects, the disclosed systems can first perform a live migration setup process. During the live migration setup, the disclosed systems can configure a source device (e.g., a storage device including or having access to a fault resilient storage device) to create a connection with a destination device to transfer the virtual machine configuration data to the destination device. The disclosed systems can set up a virtual machine on the destination device and memory can be allocated to the destination virtual machine. Further, the disclosed systems can perform various checks such as validating that the host and/or hypervisor associated with the destination device can receive the source virtual machine (e.g., the disclosed systems can determine various parameters are sufficient such as memory, disk connectivity, combinations thereof, and/or the like.

In another embodiment, the disclosed systems can perform a transfer of various memory pages from the source device to the destination device in accordance with the variously described embodiments herein. In one embodiment, the disclosed systems can, at this stage of a live migration, assign the memory to the migrating virtual machine that is copied over the network to the destination device, for example, by performing aspects of the methodology described herein. This memory can be referred to as the "working set" of the migrating virtual machine. In some aspects, the page of memory can be 4 KB, or any suitable size. The disclosed systems can be configured to permit the migrating virtual machine to continue to run. In some embodiments, the disclosed systems can configure a hypervisor to iterate the memory copy process. In some examples, each iteration may require a smaller number of modified pages to be copied. After the working set is copied to the destination server, modified pages can be transferred in accordance with various aspects of the methodology described herein.

In this state, live migration the disclosed systems can include a memory copy process that duplicates the remaining modified memory pages to the destination server in accordance with the methodology described herein. In some embodiments, the source device can transfer certain information such as the CPU and device state of the virtual machine to the destination device. In some respects, the faster the source device transfers the modified pages from the migrating virtual machine's working set, the more quickly the live migration may be completed. Further, the number of pages transferred may be based on how actively the virtual machine accesses and modifies the memory pages. After the modified memory pages are copied to the destination server, the destination device can have an up-to-date working set of virtual machine.

In some examples, during this stage of live migration, control of the storage associated with virtual machine such as any virtual storage files or physical storage attached through a virtual adapter, can be transferred to the destination device. Further, the disclosed systems can bring the virtual machine online on the destination device. The destination device can now access the working set of the virtual machine, as well as access to storage used by virtual machine.

In some embodiments, the disclosed systems can be used in connection with hyperscaler environments (e.g., data centers). In some aspects, various hyperscaler environments are configured to using ephemeral storage devices in which the storage device provide storage space which is used for a certain time while a virtual machine is alive. In some embodiments, the disclosed systems may be suitable to work in such environments (e.g., hyperscaler environments using ephemeral storage devices and methods), for example, in comparison with main storage. For example, this can be due to the reason that in main storage devices, systems may not be configured to be readable during faults. However, ephemeral storage devices can store temporary data in volatile memory. Accordingly, the disclosed systems can be configured to operate with more recent data which can exit while the faulty storage device is running. In this case, the disclosed systems may be able to find data written to volatile memory (e.g., DRAM) and are not corrupted.

The disclosure will now describe some aspects of a context in which storage systems including fault resilient storage devices for the live migration of virtual machines can be used. In particular, FIG. 1 shows a computing system that illustrates an example network in which the systems and methods for performing live migration for ephemeral storage devices can operate, in accordance with example embodiments of the disclosure. As shown in the diagram, system can include a host 105 connected to one or more storage devices 110 (or "drives"). The storage devices 110 may be connected to the host 105 through a volume manager 115 as shown, or the storage devices may be directly connected to the host 105. In some embodiments, a storage device 110 may experience an internal fault condition, and the storage device may exhibit various resilient behaviors, as discussed in further detail below, to mitigate the system-level impact of the fault condition. A given storage device 110 may be a solid state drive (SSD) and it may include a controller 120 (or "control circuit") and storage media 125 (e.g., not AND (NAND) flash memory). The smallest erasable unit in the storage device 110 may be referred to as a "block" and the smallest writeable unit in the storage device 110 may be referred to as a "page". Each storage device 110 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 105, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS).

Some further details of the storage device are now provided. In some respects, the storage media 125 may have a retention period (which may depend on the usage history of the storage media 125, and, as such, may vary within the storage media 125); data that has been stored longer than the retention period (i.e., data having an age exceeding the retention period) may become unreliable and may be said to have expired. Data may be stored in the storage media 125 using an error correcting code, which may be a block code. When data is read from the storage media 125, a quantity of raw data, referred to as a code block, may be read from the storage media 125, and an attempt to decode it may be made. If the attempt fails, additional attempts (read retrials) may be made. With use, a portion, e.g., a block, of the storage media 125 may degrade to the point that the retention period becomes unacceptably short, and the block may be classified as a "bad block". To avoid allowing this circumstance to render the entire storage media 125 inoperable, reserve space, referred to as "bad block management reserve space" may be present (e.g., included in each flash memory die or in each flash memory plane), and the controller 120, or another controller internal to the flash memory die or to the flash memory plane may begin to use a block in the reserve and cease to use the bad block.

Now the disclosure will describe some further details of various fault states associated with fault resilient storage devices which can be used for the purpose of live migration of virtual machines. In particular, the fault resilient storage device can experience a wide variety of faults, and can continue to operate in the network shown and described in connection with FIG. 1 in order to perform live migration of virtual machines. Some of such faults are described as follows.

In particular, FIG. 2A is a table of fault conditions (or "fault states") associated with the fault resilient storage devices, each labeled with a case identifier ("Case ID"). Case 1 is any fault condition in which the storage device 110 is no longer capable of performing read or write operations, and that cannot be resolved by cycling power or reformatting the storage media. The state in which the storage device 110 behaves in this manner may have various sub-states, with, e.g., each sub-state corresponding to a different failure mechanism. Such a state, or fault condition (in which the storage device 110 is no longer capable of performing read or write operations, and that cannot be resolved by cycling power or reformatting the storage media) may be caused, for example, by a portion of the controller's firmware becoming corrupted (in which case it may be possible for the controller to restart into a safe mode, in which the corrupted instructions are not executed) or by a failure of a processing circuit in the storage device 110 (e.g., the failure of a processing circuit that manages interactions with the storage media but is not responsible for communications with the host 105). When a fault condition of this type occurs, the storage device 110 may respond to any read or write command from the host 105 with an error message.

Case 2 is any fault condition (i) in which the storage device 110 is no longer capable of performing read or write operations and (ii) from which recovery is possible by cycling the power of the storage device 110 or by reformatting the storage media. Such a fault condition may be caused, for example, by a program execution error of the controller 120 of the storage device 110 (e.g., a pointer that is out of range as a result of a bit flip in the random-access memory (RAM) of the controller 120, or an instruction that is incorrect, as a result of a bit flip). If the program execution error has not caused the controller 120 to write incorrect data to the storage media 125 (e.g., if the program execution error occurred since the most recent write to storage media by the controller), then power cycling the storage device may be sufficient to restore the storage device 110 to normal operation; if the program execution error has caused the controller 120 to write erroneous data to the storage media 125, then reformatting the storage media 125 may be sufficient to restore the storage device 110 to normal operation.

Case 3 is any fault condition that may be mitigated by operating the storage device 110 in a read-only mode, and for which reformatting the storage media 125 will not restore full functionality. Examples of such faults include (i) a temperature sensor failure, and (ii) a portion of the storage media 125 having transitioned to a read-only mode. In the case of the temperature sensor failure, the failure may be detected by determining that a temperature sensor reading is out of range (e.g., has exceeded a threshold temperature), and in such a case the risk of overheating of the storage device 110 may be reduced by avoiding write operations, which may dissipate more power than read operations. The transitioning to a read-only mode of a portion of the storage media 125 may occur, for example, for flash memory storage media 125, if a flash memory plane or die exhausts the bad block management reserve space used for run time bad block management. For example, the storage device 110 may, while attempting to performing a read operation, make an unsuccessful attempt to decode a data item, determine that the block storing the data is a bad block and upon moving the data from the bad block to the bad block management reserve space, determine that the remaining bad block management reserve space is less than a threshold size and therefore insufficient to insure the reliability of the plane or die. The storage device 110 may then determine that bad block management is no longer being performed, and transition to a read-only mode. Operation of the read-only mode is discussed in further detail below. As used herein, a "data item" is any quantity of data being processed in one operation, e.g., the data resulting from decoding a code block may be a data item.

Case 4 is any fault condition that may be mitigated by operating the storage device 110 in a write-through mode. For example, if a power supply backup capacitor in the storage device 110 fails, the device may, in response to any write commands received from the host, complete the write to the storage media 125 before sending a command completion to the host 105, so that if power fails before the write to the storage media 125 has been completed, the host is not incorrectly informed that the write was completed successfully. Operating in the write-through mode may result in a reduction of performance (in terms of throughput and latency).

Case 5 is any fault condition that may be mitigated by operating the storage device 110 in a manner that reduces power dissipation. For example, in the case of a temperature sensor failure, the storage device 110 may operate in a read-only mode as mentioned above, or it may reduce the rate at which operations (e.g., write operations, which may dissipate more power than read operations) are performed, to reduce power dissipation in the storage device 110. For example, the storage device 110 may perform a first write to the storage media, then wait, during an interval corresponding to the reduced performance (the waiting resulting in a decrease in the rate at which write operations are performed); and then perform another (e.g., a second) write to the storage media.

Case 6 is any fault condition that may be mitigated by operating the storage device 110 in a read-only mode, and for which reformatting the storage media 125 will restore full functionality. The third column of the table of FIG. 2A indicates, for each case, whether valid user data remain available, and whether the storage device 110 may, e.g., by reformatting the storage media 125, be returned to full functionality.

As exemplified by the cases listed in FIG. 2A, in some embodiments, three levels of fault resiliency may be achievable by a storage device 110, a fully resilient mode, a partially resilient mode, and a vulnerable mode. In the fully resilient mode, the storage device 110 may operate with "self-healing" features, and the storage device 110 may be capable of recovering full functionality (although the user data in the device may be lost) by resetting operations such as power cycling or formatting of the storage media 125.

In the partially resilient mode, the storage device 110 may operate with lower performance, smaller capacity, or reduced capability, when a fault condition exists. For example, as mentioned above, if a power supply backup capacitor fails, all writes may be completed (i.e., command completions may be sent to the host 105) only after data is written to the storage media 125 (i.e., only synchronous writes may be performed), slowing the operation of the storage device 110, and reducing its performance. The user data may be preserved, in this circumstance. The storage devices 110 may operate with smaller capacity if the reserve space for bad block management run time bad block (RTBB) is exhausted. In this circumstance, the affected dies in the storage device 110 may be excluded from the disk space and the overall disk capacity may be reduced. The user data on the lost space may be lost. For example, if a set in IO determinism or a zone in a zoned namespace is no longer capable of accepting new data writes, the set or the zone may be excluded from disk space but the remaining disk space may remain available for read and write operations. The user data on the zone or set may be lost.

The storage device 110 may operate with reduced capability if a storage device 110 does not allow write operations, and switches to a read-only mode. The storage device 110 may be capable operating in two types of read-only mode: a sustainable read-only mode, and an unsustainable read-only mode. In the sustainable read-only mode, the storage device 110 may continue to serve read requests beyond the retention period of the storage media 125. In the unsustainable read-only mode, the storage device 110 may continue to serve read requests during the retention period of the storage media 125, and, if the storage device 110 encounters data integrity issues (as detected, for example, by one or more unsuccessful attempts to decode data during read operations, the storage device 110 may report the invalid data region. A storage device 110 operating in the vulnerable mode may, as mentioned above, be incapable of performing read or write operations, and may perform a graceful exit, continuing to receive commands from the host and returning errors.

Some further details of the example internals storage device (e.g., fault resilient storage device) are provided below. In some embodiments, five logical block address (LBA) space types may be defined, referred to as (i) performing space (P), (ii) underperforming space (UP), (iii) read-only space (RO), (iv) volatile read-only space (VRO), and (v) inaccessible space (IA). Performing (P) space may be LBA space containing valid data, which is capable of being read and written in a normal manner without sacrificing performance. Underperforming (UP) space may be LBA space containing valid data, which is capable of being read and written in a normal manner, but with degraded performance (e.g., degraded write performance). Read-only (RO) space may be LBA space containing valid data, which is read-only. The storage device 110 may respond with error messages to write commands from the host directed to this type of LBA space. The data in read-only space may remain valid for a period of time exceeding the retention period. Volatile read-only (VRO) space may be read-only, and the storage device 110 may respond with error messages to write commands from the host directed to this type of LBA space. Data in this type of LBA space may be temporarily valid, and may become invalid when it expires, i.e., when the age of the data in the storage media 125 reaches the retention period of the storage media 125. Inaccessible (IA) space may be LBA space containing invalid data, which is not accessible from the host. The table of FIG. 2B shows the combinations of LBA space types that may be present in a storage device 110 in each of the fault conditions identified in the first column of the table. The modes identified with an asterisk (*) may support the host's using a get feature command to retrieve the detailed information about LBA space. FIG. 2C shows arguments of a "get feature" command, that may be passed to a storage device 110 to query the storage device 110 regarding its state and the values of associated parameters ("IOPS" means input and output operations per second).

The table of FIG. 2D shows non-volatile memory express (NVMe) commands that a host 105 may employ to query a storage device 110 regarding its status, and a hierarchy of enumerated constants that the storage device 110 may employ to respond.

In various embodiments, as noted above, the disclosed systems can include fault resilient storage devices that can be configured to operate in a read-only mode. However, in some practical situations, the disclosed systems may find additional utility for applications in which the read-only mode may not provide an adequate quality of service (QoS). Accordingly, certain applications may benefit from the fault resilient storage devices operating (e.g., in a partial write mode) even if there is a device fault, and this case can include the partially fault resilient mode of operation. For example, the disclosed systems can be configured to report the storage device's status (e.g., to a host) and perform a graceful exit of the fault resilient storage device when the device is non-responsive. However, there may be situations in which the fault resilient storage device is in an invalid state but the device can still be operational and responsive. In some cases, the fault resilient storage device can still respond (e.g., to host requests) in a case where a portion of the data stored on the fault resilient storage device may inaccessible while other portions of the device can be accessible. Rather than retire the fault resilient storage device entirely, the disclosed systems can be configured to continue to allow for certain operations to continue (e.g., on accessible regions of the fault resilient storage device and/or with data that has already been written and so may still be valid). Accordingly, in a fault condition, the disclosed systems can be configured such that the fault resilient storage device can report (e.g., to a second storage device and/or to a hypervisor of a host) which regions and or data blocks associated with the device are valid. Such valid data may be used in the live migration of a virtual machine between storage devices.

In further embodiments, the disclosed systems can be configured to disable one or more dies within a fault resilient storage device while not disabling other dies in the fault resilient storage device. Accordingly, the disclosed systems can be configured to isolate a fault region and provide information to a host (or other requesting device) about which regions (e.g., logical block address (LBA) spaces/regions) associated with the fault resilient storage device are invalid and which regions are valid.

Further described herein are systems, methods, and apparatuses that describe how to recover data on systems including fault resilient storage devices in situations in which the fault resilient storages can provide information associated with valid (e.g., accessible) and invalid (e.g., inaccessible) regions of the fault resilient storage device. As noted, the disclosed systems can be configured to operate in systems that are running virtual machines. In some embodiments, the disclosed systems can encounter a fault associated with device running and/or storing data associated with a faulty virtual machine. Accordingly, the disclosed systems can be configured to migrate the virtual machine to another device and migrate data associated with the virtual machine to a second storage device. In some embodiments, a given storage device in a source machine can experience a fault, and therefore, if the device is a fault resilient storage device, the fault resilient storage device can switch to a fault resilient mode of operation, as variously described herein.

Figure 3A:
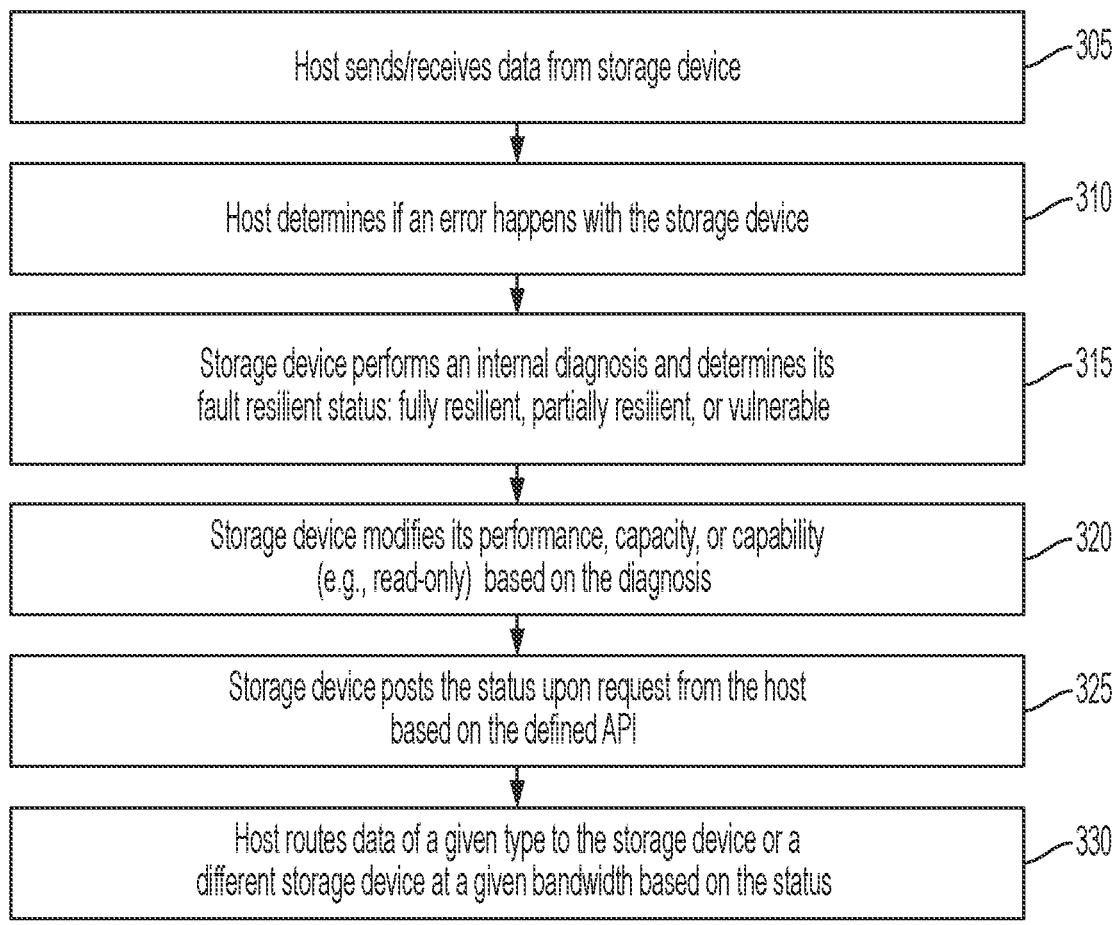
FIG. 3A is a flow chart for a first method of operation of a fault-resilient storage device, according to an embodiment of the present disclosure.

FIG. 3A is a flow chart of a method for operating a fault resilient storage device in a fault resilient mode, in some embodiments. At 305, the host 105 sends or receives data from storage device; at 310, the host 105 determines whether an error has occurred in the storage device; at 315, the storage device 110 performs an internal diagnosis and determines its fault resilient status (e.g., fully resilient, partially resilient, or vulnerable); at 320, the storage device 110 modifies its performance, capacity, or capability (e.g., transitioning to a read-only mode) based on the diagnosis; at 325, the storage device 110 posts the status upon request from the host 105 based on an application programming interface (API); and at 330, the host 105 routes data of a given type to the storage device 110 or to a different storage device 110 at a given bandwidth based on the status.

Figure 3B:
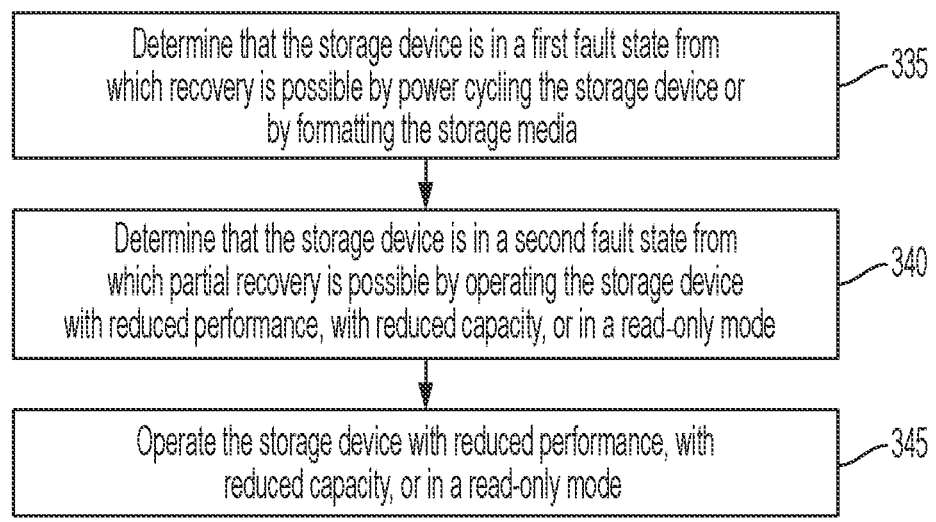
FIG. 3B is a flow chart for a second method of operation of a fault-resilient storage device, according to an embodiment of the present disclosure.

FIG. 3B is a flow chart showing details of a method for operating in a fault resilient mode. The method includes: at 335, determining, by the storage device, that the storage device is in a first fault state from which recovery is possible by power cycling the storage device or by formatting the storage media; at 340, determining, by the storage device, that the storage device is in a second fault state from which partial recovery is possible by operating the storage device with reduced performance, with reduced capacity, or in a read-only mode; and, at 345, operating the storage device with reduced performance, with reduced capacity, or in a read-only mode.

A number embodiments and variations on the embodiments disclosed herein may also be constructed. A field programmable gate array (FPGA) or embedded processor may perform internal block checks and send asynchronous updates to the host 105 on the status of the storage device 110. Events may occur and be transmitted to the host 105 (e.g., temperature, or other parameters internal to the device). The host 105 may poll the storage devices 110 on a predetermined schedule, if there is no device driver feature for providing notification. An FPGA or embedded processor may monitor the historical performance of the storage device 110 and use machine learning to provide predictive analytics (e.g., a likelihood to be in a given fault resilient state). Commands may be introduced in the NVMe specification; for example telemetry information of the NVMe specification may be expanded (to report the state of the storage device 110). Some embodiments may be implemented in, for example, Ethernet storage devices or key-value (KV) storage devices.

Figure 4A:
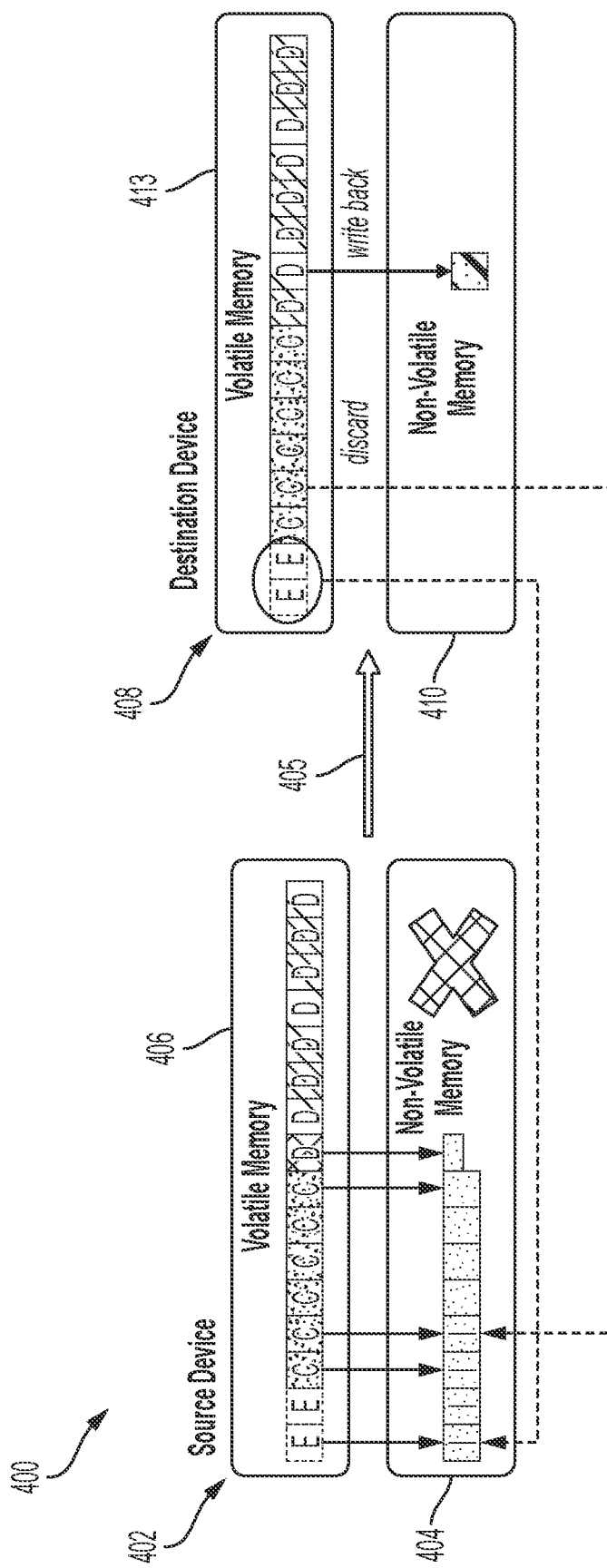
FIG. 4A shows a diagram for performing a live virtual machine migration using a storage device, in accordance with example embodiments of the disclosure.

FIG. 4A shows a diagram for performing a live virtual machine migration using a storage device, in accordance with example embodiments of the disclosure. Diagram 400 includes a source device 402 and a destination device 408. In some embodiments, the source device 402 can include a storage device (e.g., a solid state drive, SSD). In another embodiment, the source device 402 can include a non-volatile memory 404 component and a volatile memory 406 component. In one embodiment, the volatile memory 406 can include an in-memory working set that can actively handle pages associated with data blocks that are being processed by the source device 402. As shown, some of the pages can be marked as evicted (E), clean (C), dirty (D), and/or flush (F) (not shown). In another embodiment, the non-volatile memory 404 can include pages associated with data that is persisted on the local storage (e.g., NAND) of the source device 402. As shown in the example of diagram 400, some of the pages can be marked as occupying an inaccessible (I) space of source device 402. Further, the destination device 408 has a similar structure as the source device 402 in that the destination device 408 can include a non-volatile memory 410 and a volatile memory 413. Similarly, in one embodiment, the volatile memory 413 of the destination device 408 can include an in-memory working set that can actively handle pages associated with data blocks that are being processed by the destination device 408. In another embodiment, the non-volatile memory 410 can include pages associated with data that is persisted on the local storage (e.g., NAND) of the destination device 408.

In some embodiments, diagram 400 shows an example operation 405 for virtual machine migration, for example, in the case of a post-copy operation. In such an operation 405, on the source device 402 side, a portion of the data in the volatile memory 406 may be persisted onto the non-volatile memory 404 of the source device 402. In particular, shown as an example, some of the evicted pages and clean pages may be persisted to an inaccessible space associated with non-volatile memory 404. In another embodiment, shown as an example, a dirty page in the volatile memory 406 may in the process of being written to the non-volatile memory 404 when the source device 402 experiences a fault. In another embodiment, if the source device 402 is not fault resilient, then the operation 405 will result in a potentially unsuccessful migration of the data from the source device 402 to the destination device 408. In particular, as shown as an example, if the system attempts to read pages on the non-volatile memory 404 of the source device 402 associated with some evicted blocks at the volatile memory 413 of the destination device 408 a second time, such an operation may fail at least because the source device 402 has experienced a fault. Further, if the system attempts to read pages on the non-volatile memory 404 of the source device 402 associated with some clean pages at the volatile memory 413 of the destination device 408, such an operation may fail because the volatile memory 413 of the destination device 408 may discard the clean pages and further, the destination device 408 cannot recover the corresponding pages from the non-volatile memory 404 of the source device 402 at least because the source device 402 has experienced a fault. Accordingly, as shown, only a portion of the pages residing in the volatile memory 413 of the destination device 408 (e.g., the dirty block shown in diagram 400) may be persisted to (or written back) the local storage, that is, the non-volatile memory 410 of the destination device 408.

It is to be understood that while the description above was provided in the case of a post-copy operation, similar principles may hold for other operations during the live migration of a virtual machine from the source device 402 to the destination device 408. In particular, post-copy operations for virtual machine migration can include at some of the following operations. First, post-copy can be initiated by suspending the virtual machine at the source device. In some examples, a subset of the execution state of the virtual machine (e.g., CPU state, registers, pageable memory, and/or the like) can be transferred to the destination device. The virtual machine can then be resumed at the destination device. In one embodiment, the source device can push the remaining memory pages of the virtual machine to the destination device (e.g., performing pre-paging). At the destination device, if the virtual machine tries to access a page that has not yet been transferred, such an operation can generate a page-fault. These faults may be trapped at the destination device and redirected to the source device, which may respond with the faulted page. Pre-paging can, in some aspects, dynamically adapt the page transmission order to network faults by actively pushing pages in the vicinity of the last fault. In some respects, post-copy can serve to send a given page once over the network. In contrast, pre-copy can transfer the same page multiple times if the page is dirtied repeatedly at the source device during migration. On the other hand, pre-copy may retain an up-to-date state of the virtual machine at the source device during migration. In comparison, with post-copy, the virtual machine's state can be distributed over both source and destination devices. If the destination device fails during migration, pre-copy can recover the virtual machine, whereas post-copy may not be able to recover the virtual machine.

Figure 4B:
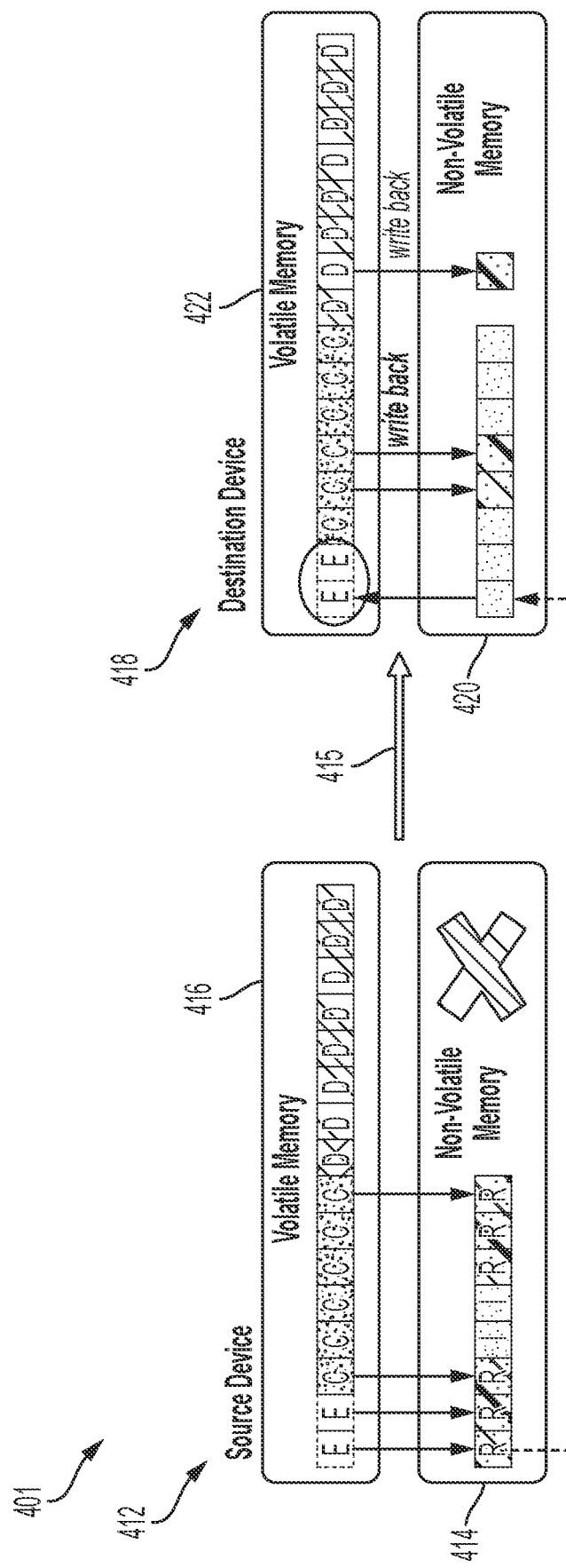
FIG. 4B shows another diagram for performing a live virtual machine migration using a fault resilient storage device, in accordance with example embodiments of the disclosure.

As shown in FIG. 4B, diagram 401 includes a fault resilient source device 412 and a destination device 418. In some embodiments, the a fault resilient source device 412 can include a fault resilient storage device such as a fault resilient SSD. In another embodiment, the fault resilient source device 412 can include a non-volatile memory 414 component and a volatile memory 416 component. In one embodiment, the volatile memory 416 can include an in-memory working set that can actively handle pages associated with data blocks that are being processed by the fault resilient source device 412. As shown, some of the pages can be marked as evicted (E), clean (C), dirty (D), and/or flush (F) (not shown), and further, this particular page structure is replicated from the case in diagram 400, so that a comparison of the device operation between the two cases can be facilitated for this example. In another embodiment, the non-volatile memory 414 can include pages associated with data that is persisted on the local storage (e.g., NAND) of the fault resilient source device 412. As shown in the example of diagram 401, some of the pages can be marked as occupying an inaccessible (I) space of fault resilient source device 412. Further, the destination device 418 can have a similar structure as the fault resilient source device 412 in that the destination device 418 can include a non-volatile memory 420 and a volatile memory 422. Similarly, in one embodiment, the volatile memory 422 can include an in-memory working set that can actively handle pages associated with data blocks that are being processed by the destination device 418. In another embodiment, the non-volatile memory 420 can include pages associated with data that is persisted on the local storage (e.g., NAND) of the destination device 418. Furthermore, the non-volatile memory 420 can include pages that are recovered from the fault resilient source device 412 and other pages that are recovered from the volatile memory 422 of the destination device 418. It can be demonstrated, for example, that both clean pages and dirty pages can be written back to (i.e., persisted to) 415 the non-volatile memory 420 of the destination device 418 based on corresponding pages in the volatile memory 422 of the destination device 418. Further, as shown in the example, certain read-only (R) pages from the accessible portion of the non-volatile memory 414 of the fault resilient source device 412 can be read from the non-volatile memory 414 of the fault resilient source device 412 due to the read-only operational status of the fault resilient source device 412.

It is to be understood that while the description above was provided in the case of a pre-copy operation, similar principles may hold for other operations during the live migration of a virtual machine from the fault resilient source device 412 to the destination device 418. Further, by way of explanation pre-copy can refer to at least some of the operations that follow. In pre-copy memory migration, a hypervisor may copy the memory pages from source device to destination device while the virtual machine may still be running on the source device. If some memory pages change (e.g., the memory pages become 'dirty') during the process, the memory pages may be re-copied until the rate of re-copied pages is greater than the page dirtying rate. Furthermore, afterwards, the virtual machine can be stopped on the original host associated with the source device, the remaining dirty pages can be copied to the destination device, and the virtual machine can be resumed on the destination device.

Figure 5:
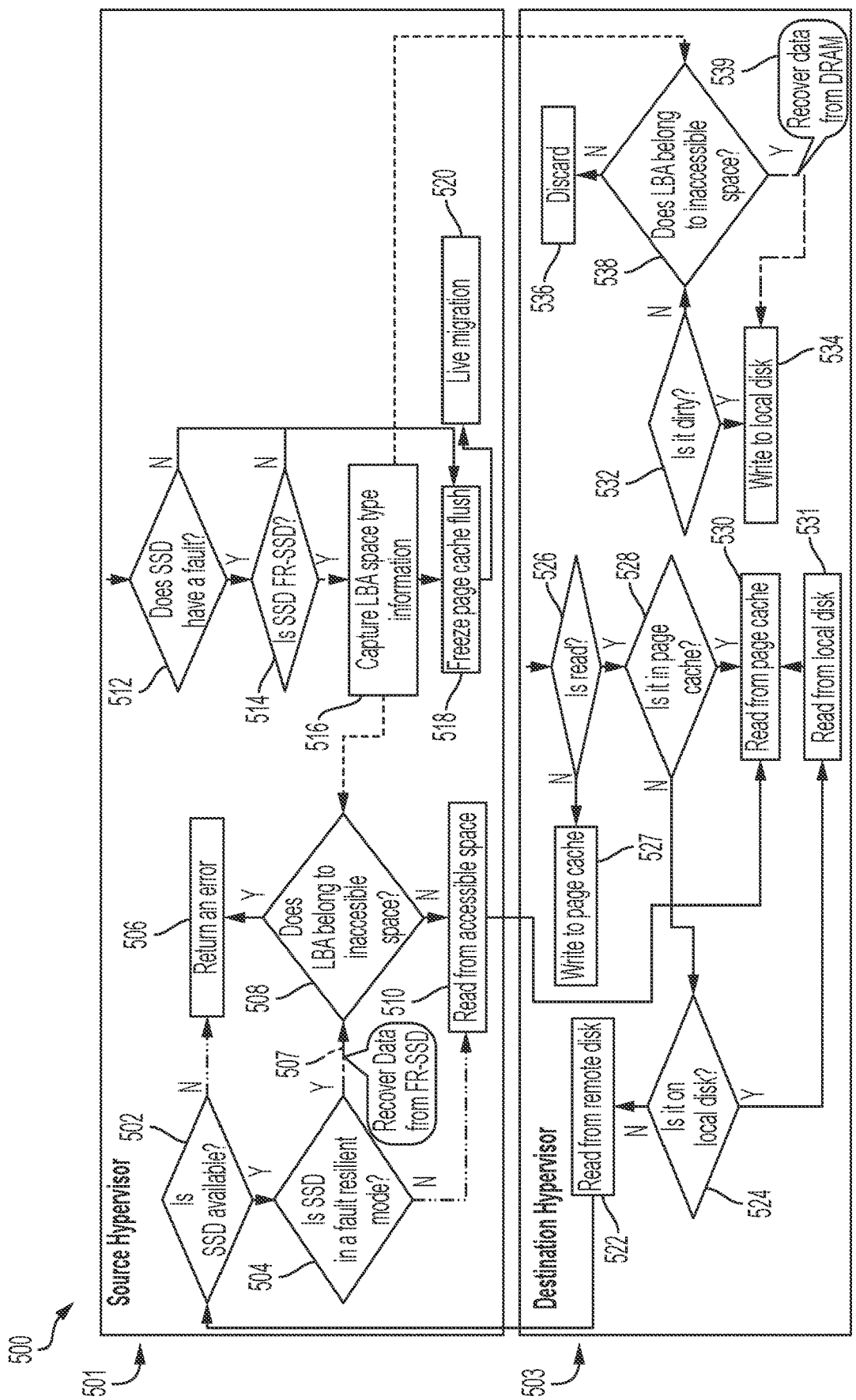
FIG. 5 is a flow chart for a method of performing a live virtual machine migration using a fault resilient storage device, in accordance with example embodiments of the disclosure.

FIG. 5 is an illustration of an exemplary flow chart showing aspects of the live migration of virtual machines, in accordance with example embodiments of the disclosure. In particular, flow chart 500 shows some example operations associated with a live migration of virtual machines between a fault-resilient source device 501 and a destination device 503, each having a source hypervisor and destination hypervisor, respectively. While reference is made to SSDs below, it is to be understood that SSDs and storage devices can be used interchangeably herein.

At block 502, the disclosed systems can determine whether an SSD (e.g., a fault resilient SSD) is available. If the result of the determination of block 502 is that the SSD is available, then at block 504, the disclosed systems can determine whether the SSD is operating in a fault resilient mode. If, on the other hand, the result of the determination of block 502 is that the SSD not available, then at block 506, the disclosed systems can return an error.

The disclosed systems, can via operation 507, recover data from the fault resilient SSD. At block 508, the disclosed systems can determine whether the logical block addresses (LBAs) corresponding to the retrieved data belong to an inaccessible space associated with the fault resilient SSD. If the result of the determination of block 508 is yes, then the disclosed systems can return an error at block 506. If, on the other hand, the result of the determination of block 508 is that the LBAs do not belong to the inaccessible space of the fault resilient SSD, then at block 510, the disclosed systems can read from the accessible space associated with the fault resilient SSD.

At block 512, the disclosed systems can determine whether an SSD in a system of storage devices experiences a fault. If no, then the disclosed systems can continue operations at block 518. If yes, then the disclosed systems can continue operations at block 514, where the disclosed systems can determine whether the SSD is a fault resilient SSD or not. If no, then the disclosed systems can continue operations at block 518. If yes, then at block 516, the disclosed systems can capture and determine the LBA space-type information associated with faulty memory sectors of the fault-resilient SSD, and can optionally determine at block 508, whether the faulty memory sectors in the fault resilient SSD include LBAs of the inaccessible space and/or determine, at block 538 (on the destination device, to be described further below), whether the LBAs belong to the inaccessible space (of the source device). The disclosed systems can further proceed to block 518, described below.

At block 518, the disclosed systems can free the page cache flushing operations associated with the SSD (either fault resilient SSD or regular SSD), in order to allow for a live migration process, which can then begin as indicated at block 520.

At block 526, the disclosed systems can determine whether an operation associated with the live migration process includes a read operation. If not, the disclosed systems can, at block 527, write the data blocks associated with the write operation to page cache. If yes, then the disclosed systems can, at block 528, determine whether the data blocks are present in the page cache of the destination device (e.g., at the volatile memory of the destination device). Further, if the result of the determination at block 528 is that the data blocks are not in the page cache of the destination device, the disclosed systems can proceed to operations at block 524, described below. If the result of the determination at block 528 is that the data blocks are in the page cache of the destination device, then the disclosed systems can proceed to block 530, where the disclosed systems can read the data from the page cache of the destination device.

At block 524, the disclosed systems can determine whether the data blocks for the read operation (e.g., the read operation of block 526) can be found on the local disk (e.g., the non-volatile memory of the destination device). If not, then at block 522, the disclosed systems can read the data blocks from the remote disk (e.g., by continuing operations on the source device starting at example operation of block 502, described above). If, on the other hand, the data blocks for the read operation can be found on the local disk, then, at block 531, the disclosed systems can read the data blocks from the local disk (e.g., the non-volatile memory of the destination device).

As noted, at block 538, the disclosed systems can determine whether the LBAs associated with the data blocks belong to an inaccessible space (associated with the non-volatile memory of the source device). If no, then the disclosed systems can, at block 536, discard the data blocks and/or pages. If yes then the disclosed systems can, via operation 539, recover the data blocks from the DRAM (e.g., the volatile memory) associated with the destination device, and can proceed, at block 534, to write those blocks to local disk (e.g., the non-volatile memory of the destination device). Further, the disclosed systems can, at block 532, determine whether the data blocks and/or pages involved in the operations described at block 538 are dirty. If the disclosed systems determines that the data blocks and/or pages are dirty, then the disclosed systems can write, at block 534, the data block to local disk (e.g., the non-volatile memory of the destination device).

In some embodiments, the flow chart 500 describes how the disclosed systems can migrate a virtual machine from a source server (e.g., server) to a destination device (e.g., server). Above, some example operations are described, and now a more general summary and discuss of those operations is provided.

As noted above, virtual machine migration as performed by some systems may not include a checking operation for data residing on volatile memory (e.g., DRAM) associated with one or more of the destination device or the source device. In some embodiments, the disclosed systems can serve to recover storage device information (e.g., virtual machine-related data to be migrated) by using information stored at least temporarily in volatile memory in certain conditions (e.g., in an opportunistic manner, described below).

In some embodiments, when a fault occurs, the disclosed systems can effectively freeze the operations associated with a virtual machine running on the link including the faulty device, and the disclosed systems can start a migration process, for example, on the source device that has the fault. In various embodiments, the source device can include a fault resilient storage device, and the fault resilient storage device can further provide information (e.g., a LBA fault resilient space information), for example, to an operating system (OS)/hypervisor associated with the source device. Accordingly, the disclosed systems can transfer the virtual machine to a destination device, and the corresponding hypervisor can be notified about which portions of the storage devices associated with the virtual machine are valid and invalid; further, if the portion of the storage device is invalid, the disclosed systems can be configured to perform operations to recover data from the volatile memory of the source or destination device. Accordingly, during migration, the virtual machine may be executed and perform I/O.

If there is read operation at the destination device, the disclosed systems can determine if the data being requested is already present in the volatile memory of the destination device (e.g., the DRAM); if so, the disclosed systems can read the data from the associated page cache. If, on the other hand, the disclosed systems determine that the requested data is not present in the volatile memory of the destination device, then the disclosed systems can determine where to obtain the data from. In particular, if the data is not present in the local disk of the destination device, it is likely that the data resides in the local disk of the source device; therefore, the disclosed systems can check the source device for the data. In particular, if there has been completion of disk migration between the source and destination devices, the disclosed systems can check the source device's local disk for the data. However, accessing the data may depend on which memory region of the source device is being accessed. For example, if the data is being requested from a faulty region of the source device, then the data can be considered as invalid, in which case, the disclosed systems can be configured to reject the request for the data and return an error. If, on the other hand, the requested data is not on a faulty region, but is rather on a valid and accessible region of the memory of the source device, then the source device can provide the data.

Accordingly, the source device which can include a fault resilient storage device can be readable despite having the fault.

In another embodiment, if the operation requested from the source device is not a read operation (e.g., it is a write operation), then the fault status of the source device is less relevant, and the disclosed systems can be configured to write the data. In particular, the disclosed systems can be configured to first write the data to page cache; if the data is dirty the disclosed systems can later write the data to the disk of the destination device. In another embodiment, if the data is not dirty, the disclosed systems can be configured to discard the data (e.g., the disclosed systems do not need to write the data again). If the data block associated with the data are clean, that can imply that the data is available on the respective disk associated with the source or destination storage device. However, after a virtual machine migration due to fault, the disclosed systems may not be able to determine whether the data is present on a given disk or not. For example, the disclosed systems may have read the data and the data may still be located in DRAM which was not updated. Further, the underlying disk may be unavailable, since the LBA that was read is now invalid on the source machine which has experienced a fault. Accordingly, the disclosed systems can be configured to move the virtual machine to the destination device in order to recover the data.

In some embodiments, some example live migration operations can hold for device having a read only mode of operation without error. If the storage device is not configured in a read-only mode, the data may be located on the DRAM; however, if the data is dirty, the disclosed systems can still recover the data from the area being accessed on the source machine for write operations. If there is a fault with the source device but the data blocks are clean, the disclosed systems can be configured to write the data blocks to disk in order to recover the data. If there is no fault, then during virtual machine migration, the data can be considered as clean; accordingly, the disclosed systems can read the data from local (e.g., destination) or remote (e.g., source) devices. Accordingly, as described above, it is readily apparent that there can be a high degree of coupling between the hypervisor/OS and the storage devices (e.g., the source and destination devices).

Figure 6:
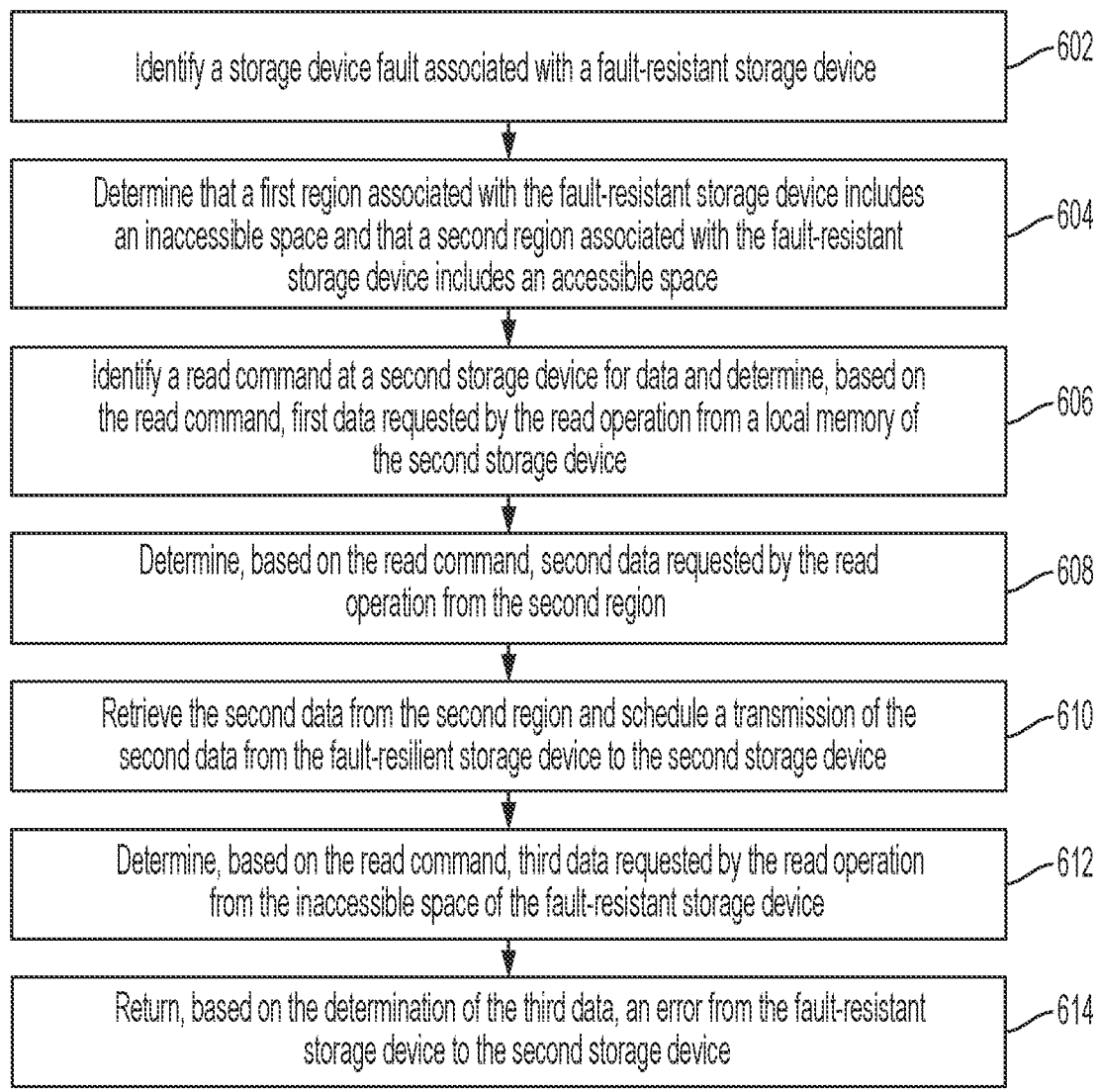
FIG. 6 is a flow chart for a method for performing examples operations associated with page cache management, in accordance with example embodiments of the disclosure.

FIG. 6 is an illustration of an exemplary flowchart for example page cache management operations, in accordance with example embodiments of the disclosure. In various embodiments, a method for determining a storage device fault associated with a fault-resilient storage device is described. At block 602, the disclosed systems can determine to perform a transmission of data from the fault-resilient storage device to a second storage device. For example, the disclosed systems can determine to move data associated with a virtual machine associated with the fault-resilient storage device to a second storage device as a part of a live migration process.

At block 604, the disclosed systems can determine that a first region associated with the fault-resilient storage device includes an inaccessible space and that a second region associated with the fault-resilient storage device includes an accessible space. In particular, the inaccessible space may include portions of NAND that are inaccessible because of a physical fault (e.g., bad circuit, bad chip, damage, too many overwrites, etc.), as variously described herein. As noted, the fault resilient storage device can experience a fault but still include memory in the accessible space that is operational (e.g., the entire memory of the fault-resilient device is not damaged uniformly as a result of the fault). The accessible space can be used in connection with the live migration process to migrate pages associated with virtual machine from the fault-resilient storage device to the destination device (e.g., the second storage device).

At block 606, the disclosed systems can determine a read command at the second storage device for the data and determine, based on the read command, first data requested by the read operation from a local memory of the second storage device. In some embodiments, the local memory can include a volatile memory such as DRAM associated with the second storage device.

In other embodiments, the disclosed systems can determine a write command at the fault-resilient storage device for the data. Accordingly, the disclosed systems can write at least a portion of the data to a page cache of a host device (e.g., a host device associated with the second storage device and/or the fault resilient storage device). Further, the disclosed systems can determine that the portion of the data includes dirty data and the disclosed systems can be configured to write the dirty data to a persistent memory (e.g., non-volatile memory) of the second storage device. Further, the disclosed systems can determine that the portion of the data includes clean data associated with the inaccessible space and the disclosed systems can write the clean data to a persistent memory (e.g., non-volatile memory) of the second storage device.

At block 608, the disclosed systems can determine, based on the read command, second data requested by the read operation from the second region. In some embodiments, the read command for the second data can include an accessible space of the fault resilient storage device. At block 610, the disclosed systems can retrieve the second data from the second region.

At block 612, the disclosed systems can determine, based on the read command, third data requested by the read operation from the inaccessible space of the fault-resilient storage device. At block 614, the disclosed systems can return, based on the determination of the third data, an error from the fault-resilient storage device to the second storage device. This can be because the third data requested in in the inaccessible space of the fault-resilient storage device.

Various elements described herein, such as the host 105 or the controller 120, may be, or may contain, processing circuits. The term "processing circuit" or "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for resilient operation of storage devices and systems containing storage devices for the live migration of virtual machines have been specifically described and illustrated herein, many modifications and variations will be apparent to those skilled in the art. Accordingly, it is to be understood that a system and method for resilient operation of storage devices and systems containing storage devices for the live migration of virtual machines be constructed according to principles of this disclosure may be embodied other than as specifically described herein. The invention is also defined in the following claims, and equivalents thereof.

What is claimed is:

1. A method for page cache management, comprising:
    identifying a storage device fault associated with a fault-resilient storage device;
    determining that a first region associated with the fault-resilient storage device comprises an inaccessible space and that a second region associated with the fault-resilient storage device comprises an accessible space;
    identifying a read command at a second storage device for data and determine, based on the read command, first data requested by a read operation from a local memory of the second storage device;
    determining, based on the read command, second data requested by the read operation from the second region;
    retrieving the second data from the second region; and
    scheduling a transmission of the second data from the fault-resilient storage device to the second storage device.

2. The method of claim 1, wherein the method further comprises:
    determining, based on the read command, third data requested by the read operation from the inaccessible space of the fault-resilient storage device; and
    returning, based on the determination of the third data, an error from the fault-resilient storage device to the second storage device.

3. The method of claim 1, further comprising:
    identifying a write command at the fault-resilient storage device for the data;
    writing at least a portion of the data to a page cache of a host device;
    determining that the portion of the data comprises dirty data and writing the dirty data to a persistent memory of the second storage device; and
    determining that the portion of the data comprises clean data associated with the inaccessible space and writing the clean data to a persistent memory of the second storage device.

4. The method of claim 1, wherein the transmission of the second data comprises a live migration of at least one virtual machine from the fault-resilient storage device to the second storage device.

5. The method of claim 1, wherein the first data comprises at least a portion of the data that is cached at the local memory.

6. The method of claim 1, wherein the local memory comprises a DRAM and the identification of the first data is from a page cache.

7. The method of claim 1, wherein the data comprises data associated with at least one virtual machine of a host device.

8. The method of claim 1, wherein the storage device fault comprises the fault-resilient storage device operating in a partial read-only mode wherein the fault-resilient storage device performs at a reduced performance or at a reduced capacity.

9. The method of claim 1, wherein at least one of the fault-resilient storage device or the second storage device comprise a solid state drive.

10. A device for page cache management, comprising:
   at least one memory device that stores computer-executable instructions; and
   at least one processor configured to access the at least one memory device, wherein the at least one processor is configured to execute the computer-executable instructions to:
      identify a storage device fault associated with a fault-resilient storage device;
      determine that a first region associated with the fault-resilient storage device comprises an inaccessible space and that a second region associated with the fault-resilient storage device comprises an accessible space;
      identify a read command at a second storage device for data and determine, based on the read command, first data requested by a read operation from a local memory of the second storage device;
      determine, based on the read command, second data requested by the read operation from the second region;
      retrieve the second data from the second region; and
      schedule a transmission of the second data from the fault-resilient storage device to the second storage device.

11. The device of claim 10, wherein the at least one processor is further configured to execute the computer-executable instructions to:
   determine, based on the read command, third data requested by the read operation from the inaccessible space of the fault-resilient storage device; and
   return, based on the determination of the third data, an error from the fault-resilient storage device to the second storage device.

12. The device of claim 10, wherein the at least one processor is further configured to execute the computer-executable instructions to:
   identify a write command at the fault-resilient storage device for the data;
   write at least a portion of the data to a page cache of a host device;
   determine that the portion of the data comprises dirty data and write the dirty data to a persistent memory of the second storage device; and
   determine that the portion of the data comprises clean data associated with the inaccessible space and write the clean data to a persistent memory of the second storage device.

13. The device of claim 10, wherein the transmission of the data comprises a live migration of at least one virtual machine from the fault-resilient storage device to the second storage device.

14. The device of claim 10, wherein the first data comprises at least a portion of the data that is cached at the local memory.

15. The device of claim 10, wherein the local memory comprises a DRAM and the determination of the first data is from a page cache, and wherein the data comprises data associated with at least one virtual machine of a host device.

16. The device of claim 10, wherein the storage device fault comprises the fault-resilient storage device operating in a partial read-only mode wherein the fault-resilient storage device performs at a reduced performance or at a reduced capacity.

17. A non-transitory computer-readable medium storing computer-executable instructions which, when executed by a processor, cause the processor to perform operations comprising:
   identifying a storage device fault associated with a fault-resilient storage device;
   determining that a first region associated with the fault-resilient storage device comprises an inaccessible space and that a second region associated with the fault-resilient storage device comprises an accessible space;
   identifying a read command at a second storage device for data and determining, based on the read command, first data requested by a read operation from a local memory of the second storage device;
   determining, based on the read command, second data requested by the read operation from the second region;
   retrieving the second data from the second region; and
   scheduling a transmission of the second data from the fault-resilient storage device to the second storage device.

18. The non-transitory computer-readable medium of claim 17, wherein the non-transitory computer-readable medium further comprises computer-executable instructions comprising:
   determining, based on the read command, third data requested by the read operation from the inaccessible space of the fault-resilient storage device; and
   returning, based on the determination of the third data, an error from the fault-resilient storage device to the second storage device.

19. The non-transitory computer-readable medium of claim 17, wherein the non-transitory computer-readable medium further comprises computer-executable instructions comprising:
   identifying a write command at the fault-resilient storage device for the data;
   writing at least a portion of the data to a page cache of a host device;
   determining that the portion of the data comprises dirty data and writing the dirty data to a persistent memory of the second storage device; and
   determining that the portion of the data comprises clean data associated with the inaccessible space and writing the clean data to a persistent memory of the second storage device.

20. The non-transitory computer-readable medium of claim 17, wherein the transmission of data comprises a live migration of at least one virtual machine from the fault-resilient storage device to the second storage device.

* * * * *